United States Patent [19]

Ito et al.

[11] Patent Number: 5,173,146

[45] Date of Patent: Dec. 22, 1992

[54] PLASMA TREATMENT METHOD

[75] Inventors: Toshiyasu Ito; Toshikazu Funahashi; Yasuhiko Ogisu; Shigeyuki Takahashi; Masanobu Senda, all of Aichi, Japan

[73] Assignee: Toyoda Gosei Co., Ltd., Nishikasugai, Japan

[21] Appl. No.: 722,507

[22] Filed: Jun. 27, 1991

Related U.S. Application Data

[62] Division of Ser. No. 572,624, Aug. 27, 1990.

[30] Foreign Application Priority Data

Aug. 31, 1989 [JP] Japan .................................. 1-225078

[51] Int. Cl.$^5$ ............................................ H01L 21/00
[52] U.S. Cl. ..................... 156/345; 156/627; 118/723; 427/10
[58] Field of Search ................. 156/345, 627; 118/723; 427/10

[56] References Cited

U.S. PATENT DOCUMENTS

| 4,207,137 | 6/1980 | Tretola | 156/627 |
| 4,316,791 | 2/1982 | Taillet | 156/345 |
| 4,479,848 | 10/1984 | Otsubo | 156/345 |
| 4,579,623 | 4/1986 | Suzuki et al. | 156/627 |
| 4,767,496 | 8/1988 | Hilber | 156/627 |
| 4,960,073 | 10/1990 | Suzuki et al. | 156/345 |

FOREIGN PATENT DOCUMENTS 63-069987 3/1988 Japan .
2052339 1/1981 United Kingdom .

OTHER PUBLICATIONS

"Plasma Etching in Semiconductor Fabrication"; Russ A. Morgan; ©1985 pp. 143-203.

Primary Examiner—Brian E. Hearn
Assistant Examiner—George Goudreau
Attorney, Agent, or Firm—Cushman, Darby & Cushman

[57] ABSTRACT

Method and apparatus for improving the surface quality of a resin molding by treating it with a plasma gas, measuring and integrating ion density and stopping the treatment when the integration reaches a predetermined value.

2 Claims, 1 Drawing Sheet

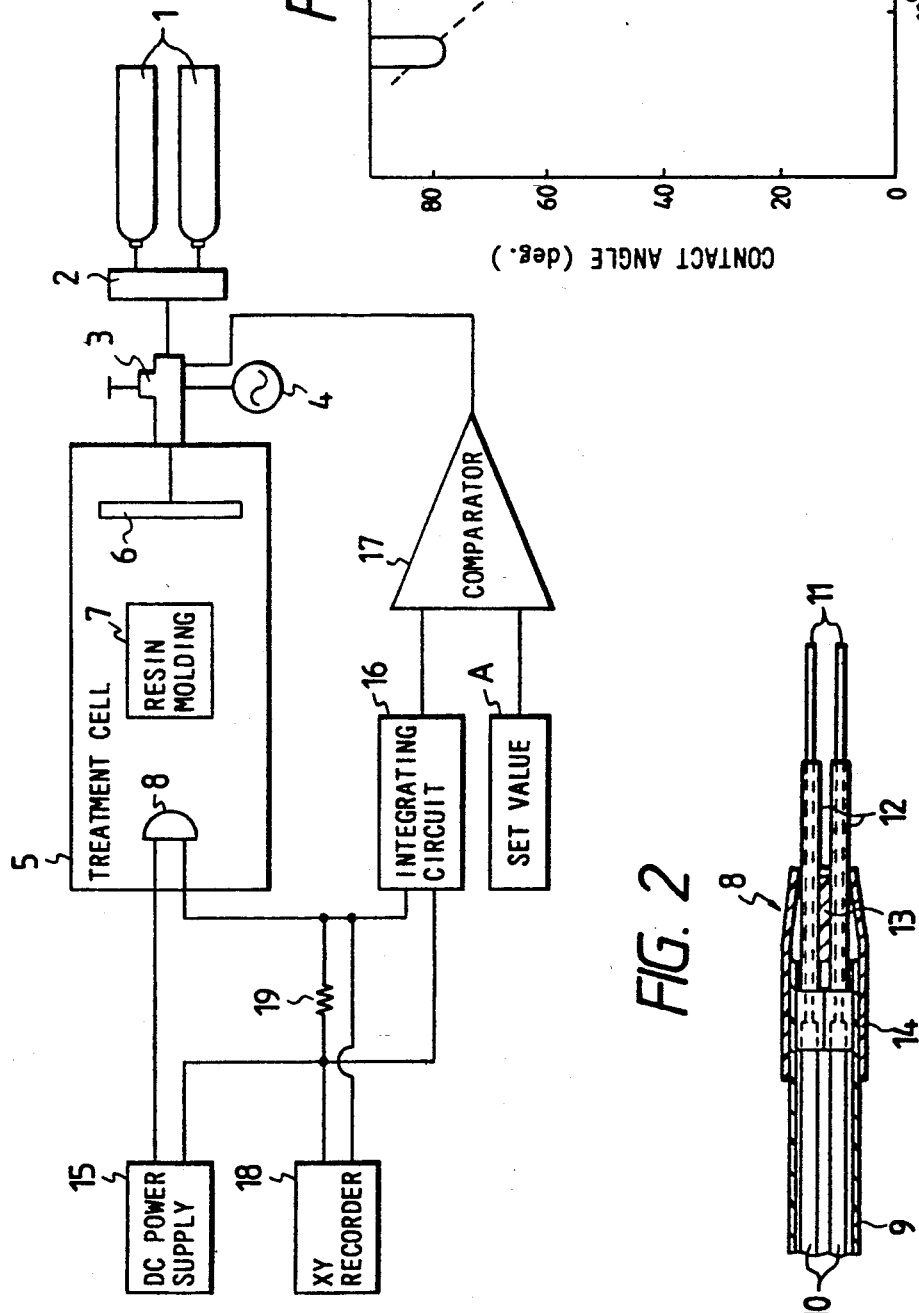
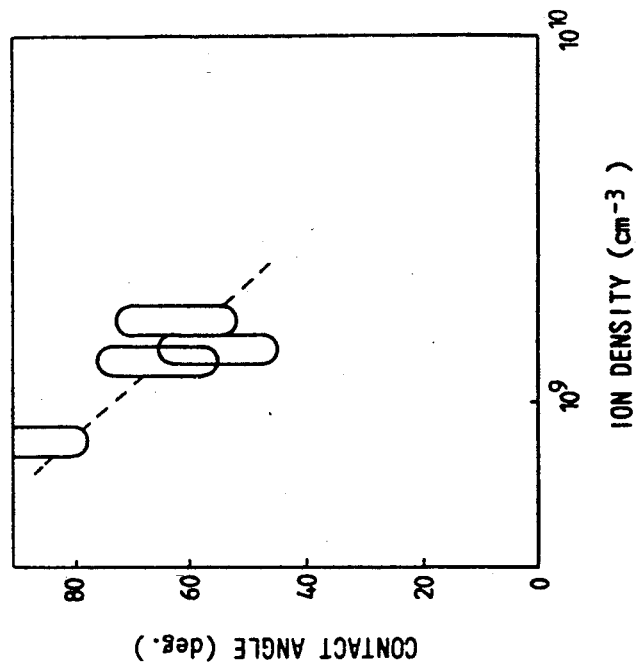
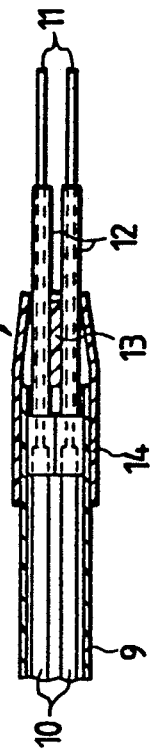

PLASMA TREATMENT METHOD

This is a division of application Ser. No. 07/572,624, filed Aug. 27, 1990.

The present invention relates to a plasma treatment method for use for application of activation treatment onto surfaces of resin moldings.

RELATED ART

Conventionally, it is known to apply activation treatment onto surfaces of resin moldings of non-polar polymer such as polyethylene, polypropylene or the like, because the adhesion of paint to the surfaces of such resin moldings is poor. In order to perform the activation treatment, various treatments are already known such as an ultraviolet irradiation treatment, a corona discharge treatment, a primer treatment, and the like. In the foregoing treatments, however, there have been problems in that the treatment cost is relatively high and the improvement of adhesion of paint is not sufficient. As a substitute for those foregoing methods, a plasma treatment is used.

For performing such a plasma treatment apparatus as disclosed, for example, in Japanese Patent Publication No. 63-51062 has been used. This apparatus is provided with a treatment chamber in which a resin molding is to be disposed, a plasma application pipe being provided in the treatment chamber for applying a plasma gas onto the surface of the resin molding. In this apparatus, the time of plasma gas application from the plasma application pipe is measured by a timer, and the application of plasma gas is stopped when a predetermined time elapses from initiation of the plasma gas application.

In the foregoing conventional plasma treatment, however, the degree of surface activation of resin moldings is sometimes reduced in spite of normal operation of the timer. That is, the quantity of plasma in the treatment chamber sometimes decreases in spite of the fact that no change occurs in the quantity of application from the plasma application pipe. Therefore, in the conventional method in which plasma treatment is stopped on the basis of treatment time, there has been such a possibility that the plasma treatment is terminated before the quantity of surface of a resin molding is sufficiently improved because the method cannot cope with such a decrease as described above.

The degree of improvement in surface quality by the plasma treatment can be detected by measuring the degree of wetness of the surface. FIG. 3 shows the results of measurement of the degree of wetness, in which the abscissa represents the ion density and the ordinate represents a contact angle of water with a surface of a resin molding when the water drops on the resin molding surface.

It is found from the drawing that the more the ion density increases, the more the contact angle decreases which thereby increases the degree of improvement of the surface quality. That is, it is considered that the quantity of active factor (an oxygen radical in the case where an oxygen gas is used as the treatment gas) contributing to the improvement of the surface quality of a resin molding is proportional to the ion density in a plasma atmosphere. The same way applies to the electron density in the plasma atmosphere. If the ion density or electron density in a plasma atmosphere can be measured, therefore, it is possible to forecast the quantity of active factor and further the degree of surface activation of a resin molding to be coated.

The present invention has been accomplished in view of the foregoing, and an object thereof is to provide a plasma treatment method and apparatus in which even if the quantity of plasma in a treatment cell is decreased, it is possible to activate a surface of a resin molding sufficiently to assure improvement of the surface quality of the resin molding.

SUMMARY OF THE INVENTION

In order to attain the foregoing object, according to the present invention, the plasma treatment method and apparatus in which a plasma gas is applied to a resin molding disposed in a treatment chamber to thereby activate a surface of the resin molding, is characterized in that ion density in the treatment chamber is continuously measured and the plasma treatment is stopped when a quantity of integration of the density reaches a predetermined value.

BRIEF DESCRIPTION OF THE DRAWINGS

An embodiment of the present invention will be described hereunder with reference to the accompanying drawings, in which:

FIG. 1 is an explanatory diagram showing the configuration of the plasma treatment apparatus;

FIG. 2 is an enlarged cross section showing the probe electrode; and

FIG. 3 is a graph showing the relation between the ion density and the contact angle.

DETAILED DESCRIPTION OF THE INVENTION

Treatment apparatus according to this invention for performing the plasma treatment of this invention is briefly described with reference to FIG. 1. Gas cylinders 1 filled with an oxygen gas to act as a treatment gas are connected to a plasma generator 3 through a gas flow meter 2. A high-frequency power source 4 is connected to the plasma generator 3 so as to supply microwave energy to the plasma generator 3 so that the treatment gas is excited by the microwave to be dissolved into a plasma gas state and a low-temperature plasma gas is made to flow out continuously. A treatment chamber 5 is provided on the flow-out side of the plasma generator 3, and a plasma application pipe 6 disposed in the treatment chamber 5 is connected to the plasma generator 3. The low-temperature plasma gas is jetted through a large number of jetting holes (not shown) formed in the plasma application pipe 6 so as to be applied to a surface of a resin molding 7 accommodated in the treatment chamber 5.

A probe electrode 8 is attached in the treatment chamber 5. In the probe electrode 8 of FIG. 2, electrodes 11 are fixedly caulked on the respective top ends (right end) of two lead wires 10 coated with fluorocarbon resin tubes 9 as shown in FIG. 2. In this embodiment, platinum electrodes, each having a diameter of about 0.5 mm, are used as the electrode portions 11 so that even if the probe electrode 8 is exposed to the plasma gas, the electrodes 11 are not oxidized. Further, an insulating tube 12 of aluminum oxide is fitted on each of the electrodes 11 so as to expose a top end portion (about 10 mm in this case) of the electrodes 11. Base end portions of the insulating tubes 12 are fixed through an epoxy adhesive 13 so that the distance between the electrodes 11 is held to be a predetermined value (about 2 mm in this case). Further, a fluorocarbon resin sealing tape 14 is wound around the exterior of the epoxy adhesive 13 so as to eliminate any influence to the plasma by gas generated from the epoxy adhesive 13.

A DC power supply 15 is connected to the input terminal of the probe electrode 8 as shown in FIG. 1. In this embodiment, a constant-voltage regulated power supply (GP060-3 produced by TAKASAGO) is used as the DC power supply 15, and is set so as always to apply a voltage of 30 V across the electrodes 11 of the probe electrode 8. When such voltage is applied, a probe current flows across the electrodes 11. The probe current varies in proportion to the ion density in a plasma atmosphere.

A resistor 19 is connected between the output terminal of the probe electrode 8 and the DC power supply 15. The resistor 19 serves to detect the probe current. It is necessary to select the resistance value of the resistor 19 so as to be sufficiently small in consideration of internal resistance of the plasma and so as to obtain an output. In this embodiment, the resistance value was set to 10 K$\Omega$.

An integrating circuit 16 is connected across the resistor 19 and arranged to operate at the same time as the start of operation of the plasma generator 3 so as to integrate the probe current detected by the probe electrode 8. Further, a comparator 17 is connected to the output terminal of the integrating circuit 16 to compare an integration value of the probe current produced from the integrating circuit 16 with a predetermined set value A so that the comparator 17 outputs a stop signal for stopping the operation of the plasma generator 3 when the integration value becomes larger than the set value A. The set value A is calculated on the basis of the quantity of active factor required for sufficiently activating the surface of the resin molding 7.

Further, an XY recorder (WX 1000 produced by GRAPHIC) 18 is connected across the ends of the resistor 19 as a monitoring recording means so as to monitor and record the probe current detected by the probe electrode 8.

When plasma treatment is performed by using the thus configured treatment apparatus according to this embodiment, first, the DC power supply 15 is turned on to apply a predetermined voltage (30 V in this case) to the probe electrode 8. Further, the pressure in the treatment chamber 5 is reduced by a vacuum pump (not shown) and the oxygen gas acting as the treatment gas is supplied from the gas cylinders 1 to the plasma generator 3 so as to make the plasma generator 3 operate. Then, the high-frequency power source 4 is turned on to supply microwave energy to the plasma generator 3.

The oxygen gas is excited into a plasma state by the microwave energy so as to become an oxygen plasma gas, and the oxygen plasma gas is sent, in a low temperature state, into the treatment chamber 5. The oxygen plasma gas is blown out from the plasma application pipe 6 and applied to the surface of the resin molding 7. When the resin molding 7 contacts with the oxygen plasma, functional groups such as a carbonyl group, a carboxyl group and the like are generated on the surface of the resin molding 7 because of the high activity of the oxygen plasma.

On the other hand, the integrating circuit 16 resets a value, which has been integrated until that time, at the same time with the start of operation of the plasma generator 3. The probe electrode 8 detects an instantaneous value of the probe current successively and continuously, and supplies the detected value to the integrating circuit 16. The integrating circuit 16 integrates the probe current supplied from the probe electrode 8, and outputs the integration value. Upon reception of the integration value of the probe current supplied from the integrating circuit 16, the comparator 17 compares the integration value with the predetermined set value A. If the integration value is not larger than the set value A, the comparator 17 outputs a signal for making the plasma generator 3 continue its operation. If the integration value becomes larger than the set value A, on the contrary, the comparator 17 outputs a stop signal for making the plasma generator 3 stop its operation.

In the plasma treatment according to the present invention, therefore, application of the plasma is not stopped before the surface of the resin molding 7 is sufficiently activated even if the quantity of plasma in the treatment chamber 5 decreases during the plasma treatment. That is, unlike the conventional plasma treatment in which the generation of a plasma gas is stopped on the basis of measurement by a timer whether or not the surface of the resin molding is sufficiently activated. Accordingly, the improvement in the surface quality of the resin molding 7 can be surely performed to make it possible to improve the quality of the resin molding 7.

Although the probe current is measured on the basis of the ion density in the plasma atmosphere by means of the probe electrode 8 in the foregoing embodiment, any modification may be applied to the embodiment without departing from the spirit of the present invention such that, for example, the electron density is measured in place of the ion density or both the ion density and electron density are measured at the same time.

As described above in detail, according to the present invention, there is an excellent effect that even if the quantity of plasma in a treatment cell has decreased, the surface of a resin molding is sufficiently activated to make it possible, assuredly, to improve the quality of the resin molding.

What is claimed is:

1. Apparatus for effecting a plasma treatment of a resin molding to improve surface quality, comprising:
    a treatment chamber for containing said resin molding,
    means for introducing a remotely formed plasma into said chamber for developing ions in said chamber,
    means for measuring ion density in said chamber,
    means for integrating the measured ion density, and
    means for stopping the introduction of remotely formed plasma into said chamber by said introducing means when ion density integration reaches a predetermined value.

2. Apparatus as in claim 1, further including means for presetting said predetermined value and comparator means for receiving said predetermined value and an output from said integrating means for applying a stop signal to said plasma introducing means when said output reaches said predetermined value.

* * * * *